3,024,262
OPTICALLY ACTIVE ORGANOSILICON
COMPOUNDS
Leo H. Sommer and Cecil L. Frye, State College, Pa.,
assignors to Dow Corning Corporation, Midland, Mich.,
a corporation of Michigan
No Drawing. Filed Feb. 16, 1960, Ser. No. 8,904
21 Claims. (Cl. 260—448.2)

The present invention relates to optically active organosilicon compounds and methods for their preparation.

Very few optically active organosilicon compounds are known to the prior art. The preparation of such known compounds was so tedious, the yields so small, and the rotations so feeble, that nothing of practical or theoretical value has been derived therefrom. [See Kipping, J. Chem. Soc., 209 (1907); 2090 (1908); and 755 (1910).] Furthermore, the prior art compounds contained only unreactive or relatively unreactive substituents attached to silicon. They lacked the "functionality" necessary for practical convertibility to the silanols and siloxanes which are of modern commercial importance. Lack of readily reactive functional substituents attached to silicon also made the prior art compounds of little value in studies of the stereochemistry of substitution at silicon.

It is an object of this invention to provide new optically active organosilicon compounds having an ample rotatory power, and to provide such compounds which have functional substituents attached to the silicon atom and which are thus suitable for a wide variety of otherwise conventional reactions and for the study of the mechanisms of such reactions. Another object is to provide practical synthetic routes to compounds of the type described above. Other objects and advantages will be apparent from the following specification.

In its broader aspects, this invention is concerned with an optically active organosilicon compound which contains at least one asymmetric triorganosilicon substituent of the formula RR'R$^2$Si—, where R is an alkyl radical, R' is a mononuclear aromatic radical, and R$^2$ is a polynuclear aromatic radical. The preferred compounds are those in which R is methyl, R' is phenyl, and R$^2$ is α-naphthyl.

The compounds of greatest interest herein are those falling within the following six classes of optically active compounds, i.e.;

(I) the precursor of the formula α-NpMePhSi(OMen) where (OMen) represents a menthoxy group;

(II) functional monomers of the formula

α-NpMePhSiY where Y is a funtional substituent selected from the group consisting of Cl, Br, F, H, deuterium, and (OR$^3$) groups where R$^3$ is selected from the group consisting of acyl, aryl, aralkyl, cycloaliphatic and primary-, secondary-, and tertiary alkyl radical;

(III) the silanol of the formula α-NpMePhSiOH;

(IV) salts of the formula α-NpMePhSiOM where M is an alkali metal;

(V) amines of the formula α-NpMePhSiN(R$^4$)$_2$ where each R$^4$ is selected from the group consisting of hydrogen, alkyl, alkylamine and aryl radicals; and (VI) the disiloxane of the formula (α-NpMePhSi)$_2$O; in the above formulae the symbols α-Np, Me, and Ph representing α-naphthyl, methyl, and phenyl radicals respectively.

In the broadly defined asymmetric substituents of the formula RR'R$^2$Si—, R can be any alkyl radical, but is preferably of from 1 to 4 inclusive carbon atoms, e.g. methyl, ethyl, isopropyl, and butyl. R' is a mononuclear aromatic radical such as phenyl, and can have substituents on the ring, for example, those such as are present in tolyl, xylyl, chlorophenyl, bromophenyl, and the like. R$^2$ is a polynuclear aromatic radical such as naphthyl, anthracyl, biphenyl (i.e., xenyl), or terphenyl (i.e., 1,4-diphenylbenzene). The R$^2$ radicals also can contain substituents such as alkyl radicals or halogen atoms attached to one or more of the aromatic nuclei.

The open valence of the silicon in RR'R$^2$Si— can be satisfied by any element or group capable of attachment to silicon, and RR'R$^2$Si— thus represents an optically active directing portion of any of the otherwise known monomers or polymers of organosilicon chemistry.

Obtaining any particular optically active compound within the scope of this invention is made possible by the fact that diastereomeric (—)-menthoxy silanes containing the R, R', and R$^2$ radicals attached to the silicon atom can be separated by crystallization into a pure diastereomeric crystalline portion with the other diastereomer being left as a residual syrup which is saturated with the crystalline form. In order to expedite the separation, it is of course preferable that R, R', and R$^2$ be chosen so that the particular combination of radicals results in a product which is readily crystallized. It has been found that the use of methyl, phenyl, and α-naphthyl radicals attached to silicon leads to particularly desirable results. These radicals are hereafter designated Me, Ph, and α-Np respectively.

The fact that the silane had indeed been resolved by the above *l*-menthoxylation and separation process is proved by the optical activity of compounds in which the (—)-menthoxy group has been replaced by a moiety possessing no optical activity of its own.

The menthoxylation referred to above can be carried out by the reaction of *l*-menthol with either α-NpMePhSiCl or α-NpMePhSi(OR$^3$) compounds, where R$^3$ is an alkyl radical of 1 to 5 inclusive carbon atoms, using conventional alkoxylation or ester interchange techniques. In the preferred process α-NpMePhSi(OMe) is used as the reactant and a powdered alkali metal hydroxide is used as a catalyst. The reaction takes place in a liquid phase, and is expedited by using an inert solvent and by distilling off the MeOH which is formed by the interchange reaction. The methoxy silane reactant can be prepared by the conventional Grignard coupling reaction of PhMeSi(OMe)$_2$ with α-NpMgBr.

As noted previously, a pure diastereomer can be isolated as a first crystalline portion out of the total *l*-menthoxylated product. This fraction is more levorotatory ([α]$_D$—54°) than the residual syrup (—46°). It can be designated as the (—)α-NpMePhSiOMen(—) fraction, and is the higher melting fraction (M.P. 83° to 84° C.). Reaction of this fraction with LiAlH$_4$ inverts the sign of rotation and produces the dextrorotatory compound (+)α-NpMePhSiH. The latter can be chlorinated or brominated to yield the levorotatory (—)α-NpMePhSiCl or bromide, which represents another inversion of the sign of rotation. When either of the latter is then reduced with LiAlH$_4$, there is a retention of the sign of rotation and the levorotatory compound (—)α-NpMePhSiH is produced. This conversion from the (+)SiH compound to the (—)SiH compound is the first known example of a Walden cycle in substitution reactions at a silicon atom.

After the first crystalline fraction has been removed as above, a second different but impure isomer can be obtained from the syrup by crystallization. This is the $(+)\alpha$-NpMePhSiOMen$(-)$ isomer. It has been obtained in its impure form as crystals having M.P. 53° to 56° C. That this is a different isomer is shown by the formation of the levorotatory compound $(-)\alpha$-NpMePhSiH upon reduction with LiAlH$_4$. Poor yields and poor purity make this second menthoxy isomer an undesirable route to the $(-)$SiH compound, however. The latter fact became of little importance when it was found that the entire syrup (after the first crystallization) could be reduced to yield a mixture of the racemic silane hydride with the $(-)$enantiomer, and that the latter could be isolated from the racemic compound by crystallization. The Walden cycle as illustrated above was, of course, another good route to the $(-)$SiH compound.

The above steps can perhaps be better understood by reference to the following equations, where for simplicity the R, R', and R$^2$ radicals attached to silicon have been designated merely Z$_3$Si:

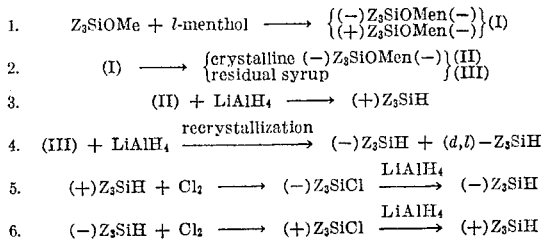

In the LiAlH$_4$ reductions referred to above, the LiAlH$_4$ is used in an amount at least equivalent to, and preferably in excess of, the compound being reduced.

The chlorosilane isomers described above can be reacted with various alcohols or phenols to produce the corresponding alkoxy or phenoxy derivatives. The reactions with primary alcohols are best carried out in the presence of an HCl acceptor such as an amine. Any of the alcohols can be reacted, but for practical purposes it is preferred to limit them to about 6 carbon atoms. Primary alcohols tend to react with retention of the sign of rotation. Secondary and tertiary alcohols are best reacted by employing them in conjunction with their potassium alcoholates, in which case the reactions proceed with inversion of the sign of rotation. Methanol solutions of the methoxy silanes are rapidly racemized in the presence of small amounts of acid or alkali.

The methoxysilanes of this invention react with LiAlH$_4$ to produce the silane hydrides, $\alpha$-NpMePhSiH, having the same sign of rotation. The t-butoxysilanes, however, provide an inversion of the sign of rotation from the same reaction, e.g., $$(+)Z_3SiOCMe_3+LiAlH_4 \rightarrow (-)Z_3SiH$$

Acyloxysilanes in accordance with this invention can be produced by merely contacting the alkali metal salt $\alpha$-NpMePhSiOM with an acyl chloride or bromide, in liquid phase and preferably in the presence of an inert solvent. Any such acid halide can be used, but those containing from 2 to 8 inclusive carbon atoms are preferred. The halides can be either aliphatic, as acetyl chloride, or aromatic as exemplified by benzoyl chloride. This type of reaction generally proceeds with inversion of the sign of rotation.

The silanols of this invention can be prepared by the reaction of the chlorosilanes with water, which proceeds with retention of the sign of rotation, or by the reaction of the salts of this invention with water, which inverts the sign of rotation. The silanols themselves react with LiAlH$_4$ to produce the silane hydride having the same sign of rotation. Aqueous-acetone solutions of the silanols give rapid racemization in the presence of small amounts of acid.

The alkali metal salts of this invention are exemplified by the Na, K, and Li salts of the general formula Z$_3$SiOM. They can be prepared by simply contacting the silanol with a powdered alkali metal hydroxide, preferably in the presence of an inert solvent for the silanol. Salt formation proceeds with inversion of the sign of rotation. The salts have an extremely high specific rotation, which changes with the concentration of the salt. These salts can also be prepared by reacting the silane hydride with KOH, in which case there is also a change in the sign of rotation. As noted before, aqueous hydrolysis of the salts produces the silanol of the opposite sign of rotation.

The disiloxanes of this invention exist in $d$, $l$, and meso forms. The $l$ form can be produced by either of two reactions:

1. $(+)Z_3SiOK + (-)Z_3SiH \rightarrow (-)SiOSi$
2. $(+)Z_3SiOK + (-)Z_3SiCl \rightarrow (-)SiOSi$ The $d$ form can be produced:

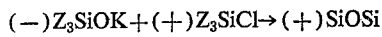

The meso form is produced from the reaction of

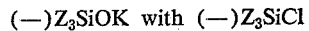

The $(-)Z_3SiF$ of this invention is produced by reacting BF$_3$ etherate with the high melting menthoxy isomer. When either the low melting menthoxy isomer or the $(-)Z_3SiOMe$ is employed in this reaction, the $(+)Z_3SiF$ is formed. The BF$_3$ etherate is employed in an amount at least equivalent to the silane reactant, and preferably in a 20 to 50 percent excess.

The aminosilanes of this invention can be prepared by reacting NH$_3$, primary amines, or secondary amines with the optically active chlorosilanes, in the same manner as is well known in the case of conventional organochlorosilanes. The amines can be aromatic, aliphatic, or mixed. Aniline, toluidine, diphenylamine, methylaniline, benzylamine, $\alpha$-naphthylamine, methylamine, butylamine, diethylamine, and cyclohexylamine are illustrative examples. Polyamines such as ethylene diamine, hexamethylene diamine, and hexamethylene tetramine may also be employed. Heterocyclic compounds such as piperidine also undergo a comparable reaction. In general, merely contacting the reactants in a liquid phase is sufficient to produce the aminosilane derivatives, although elevated temperatures may of course be used, where necessary, to expedite the reaction. In general, aqueous hydrolysis of the aminosilanes produces the silanol of the opposite sign of rotation.

The primary utility of the defined menthoxysilanes and silane hydrides lies in their use as intermediates in the preparation of many other types of optically active silanes. As has been illustrated above, most of the functional silanes can be converted to almost any other silane, silanol, salt, or siloxane of any desired sign of rotation. The hydrolyzable silanes herein can be cohydrolyzed with conventional chloro- or alkoxyorganosilanes in the conventional manner to produce the whole range of resinous, fluid, or rubbery siloxanes, all of which are well known for their commercial utility. The silanols may be used to place Z$_3$SiO— substituents on the surface of gels such as silica gels, which may then be used as column packing material through which organic $d$-$l$ mixtures can be run in order to achieve separation of optically pure organic isomers. The hydrolyzable silanes or the silanols or siloxanes can also be used to produce silica cogels in the known manner, and such cogels may be used for separation of organic $d$-$l$ mixtures as above.

The chlorosilanes of this invention react with menthol to form the menthoxy derivatives. When a mixture of $d$ and $l$ menthol is employed, the corresponding menthoxysilanes can be separated by fractional crystallization. Hydrolysis of one fraction reforms the corresponding menthol, hence the said chlorosilanes can be used to resolve mixtures of methanol into their pure *d* or *l* forms. The reactivity of any of the functional silanes can be used in like manner to achieve the separation of any optically active organic compounds which are capable of reacting with these silanes into their *d* and *l* forms.

The alkali metal salts described herein act as catalysts for the polymerization of conventional organosiloxanes such as dimethylpolysiloxanes and methylphenylpolysiloxanes. They can be used in the same manner as, for example, the known use of $Me_3SiOK$ for such purposes, and ratios of 1 Na, K, or Li atom per 100 to 5,000 Si atoms in the polymer is generally preferred. Where polymers having different radicals on each silicon atom are involved (e.g., MePhSiO, MeEtSiO, or $CF_3CH_2CH_2MeSiO$ types), the use of an optically active salt as a catalyst tends to produce an isotactic polymer wherein like radicals are lined up on one side of the polymer. This results in novel and improved physical properties as compared to the random configuration of the conventional polymers.

The following examples are illustrative only. All parts and percentages are by weight unless otherwise indicated. The symbols α-Np, Me, Et, and Ph are used as representative of α-naphthyl, methyl, ethyl and phenyl radicals respectively.

*Example 1*

A Grignard reagent was prepared by adding 5.1 mols α-NpBr to 5.1 mols Mg in 400 ml. diethyl ether. When the addition was 50 percent completed, 300 ml. tetrahydrofuran was added to the system as additional solvent. When the reaction was complete, 5.03 mols $$PhMeSi(OMe)_2$$

was added to the Grignard reagent over a period of about two hours. The reaction mass was heated under reflux for 2½ days and was then cooled and added to about 10 l. of a saturated ice water solution of $NH_4Cl$, which was an amount sufficient to dissolve all of the magnesium salts present. The organic layer was washed with water, adding additional ether as necessary to aid in rapidly separating the organic and aqueous phases. The organic layer was dried over anhydrous $Na_2SO_4$, the solvent strip distilled therefrom, and the residue fractioned to provide the compound of the formula α-NpMePhSi(OMe), B.P. 163° to 172° C. at 0.3 to 0.4 mm. Hg pressure, $n_D^{34.5}$ 1.6094. In repeated runs, yield of this product varied from about 75 to 85 percent of the theoretical.

A mixture of 834 g. (3 mols) α-NpMePhSi(OMe), 468 g. (3 mols) *l*-menthol, 750 ml. toluene, and 0.5 g. powdered KOH was heated at about 125 to 135° C. pot temperature while the toluene-MeOH azeotrope was being removed by distillation. The distillation was continued until pure toluene was being obtained as the distillate, thus indicating that the ester interchange reaction had been completed. The reaction mass was cooled, washed with water to remove the KOH catalyst, dried and distilled to yield the product α-NpMePhSi(OMen)(—), where (OMen) represents the menthoxy radical derived from *l*-menthol. The product was obtained in a yield of about 90 percent of theoretical, and boiled at 200 to 212° C. at 0.05 to 0.1 mm. Hg pressure. The product was dissolved in 1.5 times its volume of pentane, and the solution cooled to −10° C. This led to the precipitation of 33 percent of the original product in the form of crystals which upon recrystallization from pentane were found to have a melting point of 83 to 84° C. This fraction was the pure (high melting) diastereomer, showing that the silicon had been resolved, and had a specific rotation at room temperature $[α]_D^{RT}$ of −54.5°, $c=11\%$ in 96% cyclohexane-4% ethanol. (Room temperature was about 22 to 25° C. in all of such measurements.)

The pentane was strip distilled from a portion of the residual solution from the above crystallization, and the residue was diluted with two times its volume of ethanol.

The solution was cooled to −10° C. and another fraction of crystals was obtained, M.P. 53 to 56° C. This lower melting crystalline isomer was impure, but later reduction with $LiAlH_4$ proved that this fraction was largely the other isomer of the resolved silicon compound. Ignoring the organic radicals attached directly to the silicon, this isomer can be designated by the formula (+)SiOMen(−). Both the low melting and the high melting isomers had a refractive index of 1.5716 at 34.5° C.

The remainder of the residual solution from the first crystallization was found to be a mixture of the above (+)SiOMen(−) compound and the (−)SiOMen(−) compound, the former being in considerable excess. This syrup-like mixture had a specific rotation at room temperature of −46.5° (10% in 92% cyclohexane-8%EtOH)

*Example 2*

A solution was prepared containing 35 g. $LiAlH_4$, (3.7 equivalents) in 550 ml. anhydrous diethyl ether. To this solution there was added 309 g. (0.768 equivalent) of the high melting isomer prepared as in Example 1. The mixture was diluted with 500 ml. dibutyl ether, the low boiling solvent was stripped off to a pot temperature of 80° C., and the reaction mass then heated under reflux for 20 hours. In order to decompose the excess $LiAlH_4$, 174 g. acetone was added over a two hour period, and the reaction mass was added to a solution of 500 ml. concentrated hydrochloric acid in 1 l. ice water. The organic layer was separated and washed with cold dilute hydrochloric acid, then with water. The organic layer was cooled to −10° C., and the resulting crystalline precipitate was removed. Upon recrystallization from pentane, there was obtained dextrorotatory α-NpMePhSiH M.P. 62 to 63° C., $[α]_D^{RT}$ +32.4° (30% in cyclohexane). The mother liquor from the above crystallization was stripped distilled to remove all solvent and then strip distilled to yield a fraction boiling at 150 to 180° C. at 0.2 mm. Hg pressure. The latter fraction was dissolved in pentane and crystals were precipitated as above, which upon recrystallization proved to be the same dextrorotatory hydrosilane. The combined yield of pure compound amounted to 84 percent of theoretical. The product had a refractive index of 1.6305 at 34.5° C.

The less levorotatory syrup-like menthoxy isomer mixture from Example 1 was reacted with $LiAlH_4$ and the product repeatedly recrystallized from pentane as above to provide levorotatory α-NpMePhSiH, $[α]_D^{RT}$ −31.5° (1.8% in cyclohexane). This levorotatory compound was otherwise the same in its physical properties as the dextrorotatory compound above. The same levorotatory compound was obtained in a yield of 88 percent of theoretical from the $LiAlH_4$ reduction of the second (lower melting) crystals produced in Example 1. Using the deuteride $LiAlD_4$ in place of $LiAlH_4$ in these reductions produced the corresponding optically active ≡SiD compounds, having the same physical properties as the ≡SiH compounds.

*Example 3*

Chlorine was bubbled through a sulfuric acid trap and into a solution of 85 g. of the levorotatory α-NpMePhSiH in 215 g. $CCl_4$. The solution was cooled in ice water during the chlorination, and the chlorination was continued until the greenish yellow color of the solution indicated that an excess of chlorine had been added. The solution was placed under reduced pressure, first at room temperature and then as heated on a steam bath, until it was free of excess chlorine and relatively free of solvent. The residue was diluted with 170 g. pentane and the solution was cooled to −10° C. The precipitated crystals were recrystallized from pentane to provide 78.5 g. of the dextrorotatory α-NpMePhSiCl, M.P. 63 to 64° C., $[\alpha]_D^{RT}$ +6.3° in diethyl ether. This shows that a change in the sign of rotation was brought about by the chlorination reaction.

The dextrorotatory α-NpMePhSiH was chlorinated as above, and found to produce the levorotatory isomer having the same general physical properties but the opposite sign of rotation. Both the isomers had a refractive index of 1.6354 at 34.5° C., and boiled at about 155° C. at 1.3 mm. Hg pressure.

*Example 4*

A mixture of 100 g. of the high melting more levorotatory menthoxy isomer from Example 1, 70 ml. diethyl ether, and 17.8 g. BF₃ etherate was heated at 48° C., for 5 hours and the volatiles removed by flash distillation to a pot temperature of 90° C., at 1 mm. Hg pressure. The residue was dissolved in about 150 ml. hexane and the solution was cooled to −3° C. overnight. The precipitated crystals were recrystallized from pentane 3 times to provide 33 g. of pure levorotatory α-NpMePhSiF, M.P. 67.5 to 68° C., $[\alpha]_D^{RT}$ −46.2° in ether, −39° in pentane, $n_D^{23}$ 1.6128. Chemical analysis verified that this was the fluorosilane compound.

The lower melting less levorotatory product from Example 1 was subjected to the same treatment to provide the corresponding dextrorotatory product. The latter product was less optically pure, however, M.P. of 66 to 67.5° C., $[\alpha]_D^{RT}$+37.5° in pentane.

When the same preparation was carried out upon an unresolved racemic α-NpMePhSi(OMe), the racemic fluorosilane was obtained, M.P. 39 to 40° C.

*Example 5*

A solution was prepared containing 7.5 g. dextrorotatory α-NpMePhSiH in 20 ml. CCl₄, and a solution of 6 g. bromine in 10 ml. CCl₄ was added thereto at 0° C. The reaction product was worked up as in Example 4 to provide the levorotatory α-NpMePhSiBr, M.P. 52 to 53° C. $[\alpha]_D^{RT}$−24.2° in pentane.

By the same technique, but starting with the levorotatory hydrosilane, there was produced the dextrorotatory bromosilane, thus showing that a change in the sign of rotation was accomplished by bromine just as in the case of the chlorination described above.

*Example 6*

The levorotatory chlorosilane and bromosilane products of Examples 3 and 5 were each subjected to reduction with LiAlH₄, using the general techniques of Example 2. In each case the levorotatory α-NpMePhSiH was obtained. In contrast, similar reduction of the (−)-fluorosilane afforded the (+)-silane.

*Example 7*

A solution of 1 g. of the levorotatory α-NpMePhSiCl in about 20 ml. pentane was added to a solution of 1 g. methanol and 2 ml. cyclohexylamine in 80 ml. pentane. Reaction was immediate as indicated by the precipitation of the hydrochloride salt. The reaction mass was washed with water, dried, and concentrated to 5 ml. total volume. The concentrated solution was cooled to −10° C., and 0.85 g. of the levorotatory α-NpMePhSi(OMe) was obtained, M.P. 62 to 64° C., $[\alpha]_D^{RT}$−16.2° in pentane. This shows that the alkoxylation of the optically active chlorosilane proceeds with retention of the sign of rotation. The dextrorotatory chlorosilane was alkoxylated in the same way, and produced the corresponding dextrorotatory methoxysilane compound.

By the same technique as that described above, alkoxylations were carried out upon the chlorosilane with ethyl, neopentyl, benzyl, and cyclohexyl alcohol. In each case the corresponding alkoxysilanes were obtained, with the sign of rotation being retained in each case except where cyclohexyl alcohol was employed. The latter led to inversion of the sign of rotation. The specific rotations in pentane at room temperature for each alkoxysilane were as follows:

Ethoxysilane _____ 10°
Benzoxysilane _____ 13.2°
Neopentoxysilane _____ 5.4°
Cyclohexoxysilane _____ 5°

*Example 8*

A mixture of 50 ml. t-butanol and 2.3 g. potassium was heated at reflux temperature, then cooled and 20 g. of the dextrorotatory α-NpMePhSiH was added thereto. The reaction mass was heated for 4 hours at 90° C., by the end of which time the evolution of hydrogen had ceased. The reaction mass was diluted with 80 ml. hexane, washed with water, dried, and the solvents strip distilled therefrom. Qualitative analysis showed that no silicon-bonded hydrogen or silicon-bonded hydroxy groups were present in the residue. This crude residue had a specific rotation $[\alpha]_D^{RT}$ of −25.9° in pentane. The crude product was fractionally distilled to provide the pure

(t-BuO)SiPhMeα-Np

B.P. 140 to 145° C. at 0.23 mm. Hg pressure, $n_D^{25.5}$ 1.5837, $[\alpha]_D^{RT}$−25.6° in pentane.

The above alkoxylation was also carried out using the dextrorotatory chlorosilane in place of the hydrosilane, and again the levorotatory t-butoxysilane was obtained. Thus this alkoxylation proceeded with inversion of the sign of rotation in each instance.

*Example 9*

A solution of 46 g. of the dextrorotatory α-NpMePhSiCl in 700 ml. diethyl ether was added to about 1 l. of ice water. After stirring the reaction mass, the organic layer was separated and washed once with water and once with an aqueous sodium bicarbonate solution. The organic layer was dried, the solvent strip distilled therefrom, and the residue dissolved in 188 ml. xylene. Analysis showed that this was a solution of the dextrorotatory silanol α-NpMePhSiOH, $[\alpha]_D^{RT}$+26.2° in xylene. The solvent free product was a liquid having a refractive index of 1.6360 at 34.5° C. When a comparable reaction was carried out upon the levorotatory chlorosilane, the corresponding levorotatory silanol was produced, thus this reaction was shown to proceed with retention of the sign of rotation.

*Example 10*

A 228 ml. solution of 20 g. of the dextrorotatory silanol from Example 9 in xylene was shaken up with 70 g. powdered KOH, and heat was evolved as the salt was formed. The solution of the potassium salt was separated from the excess KOH and was found by titration to have a concentration of 0.349 millimols α-NpMePhSiOK per ml. of solution. At a concentration of 9.95 g. per 100 ml. xylene solution, this compound had a specific rotation $[\alpha]_D^{RT}$ of −79.5°. This compound, unlike the others studied herein, changes its degree of rotation rather sharply with change in concentration.

*Example 11*

A solution was made containing 11 ml. of the titrated solution of the levorotatory salt from Example 10, 1.08 g. dextrorotatory α-NpMePhSiCl, and 10 ml. xylene. The mixture was cooled and the precipitated crystals were recrystallized to give 1.17 g. of crystalline dextrorotatory (α-NpMePhSi)₂O, M.P. 87 to 88° C., B.P. 225 to 230° C. at 0.09 mm. Hg pressure, $[\alpha]_D^{RT}$+9° in hexane. The recrystallizations in this case were carried out using an 80:20 mixture of isopropanol and pentane as the solvent.

When the same reaction was carried out employing the dextrorotatory salt and the levorotatory chlorosilane, the corresponding levorotatory disiloxane was obtained. The optically inactive meso disiloxane was obtained when the levorotatory potassium salt was reacted with the levorotatory chlorosilane by the above technique.

Example 12

A xylene solution of the levorotatory potassium salt from Example 10 was mixed with a large excess of acetyl chloride, and a fast exothermic reaction took place. When the solvent and excess acetyl chloride were removed by distillation under reduced pressure, the oily residue was the dextrorotatory compound α-NpMePhSiOOCCH$_3$, $[\alpha]_D^{RT}$+16.7° in pentane, B.P. 161° C. at 0.19 mm. Hg, $n_D^{30°}$ 1.6051. For purposes of comparison, a racemic mixture was prepared by means of the same reaction, employing a racemic potassium salt. The racemic acetate product was a crystalline material melting at 85 to 86° C.

When benzoyl chloride or p-bromobenzoyl chloride were employed in the above reaction in place of the acetyl chloride, the corresponding optically active acyloxy derivatives were produced.

Example 13

A solution of 1.48 g. of the levorotatory

α-NpMePhSiCl in 20 ml. pentane was added to a solution of 2 ml. isobutylamine in 120 ml. pentane. The precipitated hydrochloride salt which formed was removed by filtration and was washed with pentane. The pentane washings were combined with the filtrate, providing a final total volume of 192 ml. which was a pentane solution of the compound α-NpMePhSiNHCH$_2$CHMe$_2$. This was a levorotatory product, $[\alpha]_D^{RT}$ of −5.9°.

Example 14

Dextrorotatory α-NpMePhSiCl in CCl$_4$ was chlorinated by bubbling chlorine into a solution of the silane in CCl$_4$, the reaction being carried out in the absence of light. The progress of the reaction was followed by constantly checking the $[\alpha]_D^{RT}$, and the chlorination was continued until a maximum value had been reached at +34.2°. Chemical analysis showed that 1 Cl atom per silicon atom had been introduced, and infrared analysis showed that this was on the naphthyl radical rather than the phenyl or methyl radicals. The exact position of this Cl atom is not known, but it is believed that it is most likely attached to the number 4 carbon, directly opposite from the point of attachment of the silicon atom.

The ClNpMePhSiCl produced as above was reacted with LiAlH$_4$ by the techniques of Example 6, and the liquid dextrorotatory ClNpMePhSiH was obtained, $[\alpha]_D^{RT}$+22.6° in acetone. Methoxylation of the latter by the techniques of Example 7 produced the dextrorotatory ClNpMePhSiOMe $[\alpha]_D^{RT}$+3.6° in diethyl ether.

By starting with levorotatory α-NpMePhSiCl in the above series of reactions, the corresponding series of products having the opposite sign of rotation was obtained.

That which is claimed is:

1. Dextrorotatory and levorotatory optically active organosilicon compounds selected from the group consisting of (I) the precursor of the formula α-NpMePhSi(OMen) where (OMen) represents a menthoxy group;
   (II) functional monomers of the formula α-NpMePhSiY where Y is a functional substituent selected from the group consisting of Cl, Br, F, H, deuterium, and (OR$^3$) groups where R$^3$ is selected from the group consisting of acyl, aryl, aralkyl, cycloaliphatic and primary-, secondary-, and tertiary alkyl radicals;
   (III) the silanol of the formula α-NpMePhSiOH;
   (IV) salts of the formula α-NpMePhSiOM where M is an alkali metal;
   (V) amines of the formula α-NpMePhSiN(R$^4$)$_2$ where each R$^4$ is selected from the group consisting of hydrogen, alkyl, alkylamine and aryl radicals; and
   (VI) the disiloxane of the formula (α-NpMePhSi)$_2$O;

in the above formulae the symbols α-Np, Me, and Ph representing α-naphthyl, methyl, and phenyl radicals respectively.

2. A levorotatory compound of the formula

α-NpMePhSi(OMen)

where α-Np, Me, and Ph represent α-naphthyl, methyl, and phenyl radicals respectively and (OMen) represents the menthoxy radical.

3. A levorotatory compound of the formula

α-NpMePhSiH where α-Np, Me, and Ph represent α-naphthyl, methyl, and phenyl radicals respectively.

4. A dextrorotatory compound of the formula

α-NpMePhSiH where α-Np, Me, and Ph represent α-naphthyl, methyl, and phenyl radicals respectively.

5. A levorotatory compound of the formula

α-NpMePhSiCl where α-Np, Me, and Ph represent α-naphthyl, methyl, and phenyl radicals respectively.

6. A dextrorotatory compound of the formula

α-NpMePhSiCl where α-Np, Me, and Ph represent α-naphthyl, methyl, and phenyl radicals respectively.

7. A levorotatory compound of the formula

α-NpMePhSi(OMe)

where α-Np, Me, and Ph represent α-naphthyl, methyl, and phenyl radicals respectively.

8. A dextrorotatory compound of the formula

α-NpMePhSi(OMe)

where α-Np, Me, and Ph represent α-naphthyl, methyl, and phenyl radicals respectively.

9. A levorotatory silanol of the formula

α-NpMePhSiOH where α-Np, Me, and Ph represent α-naphthyl, methyl, and phenyl radicals respectively.

10. A dextrorotatory silanol of the formula

α-NpMePhSiOH where α-Np, Me, and Ph represent α-naphthyl, methyl, and phenyl radicals respectively.

11. A levorotatory salt of the formula α-NpMePhSiOK where α-Np, Me, and Ph represent α-naphthyl, methyl, and phenyl radicals respectively.

12. A dextrorotatory salt of the formula

α-NpMePhSiOK where α-Np, Me, and Ph represent α-naphthyl, methyl, and phenyl radicals respectively.

13. A dextrorotatory disiloxane of the formula (α-NpMePhSi)$_2$O where α-Np, Me, and Ph represent α-naphthyl, methyl, and phenyl radicals respectively.

14. An organosilicon compound of the formula

α-NpMePhSi(OMen)

where α-Np, Me, and Ph represent α-naphthyl, methyl, and phenyl radicals respectively and (OMen) represents the menthoxy radical.

15. A method for the preparation of optically active organosilicon compounds which comprises carrying out an ester interchange reaction between a compound of the formula RR'R$^2$Si(OR$^3$) and *l*-menthol, whereby optically active RR′R²Si(OMen) is produced, where R is an alkyl radical, R′ is a mononuclear aromatic radical, R² is a polynuclear aromatic radical, R³ is an alkyl radical of from 1 to 5 inclusive carbon atoms, and (OMen) is a menthoxy radical.

16. A method for the preparation of optically active organosilicon compounds which comprises carrying out an ester interchange reaction between (A)

α-NpMePhSi(OR³)

where R³ is an alkyl radical of from 1 to 5 inclusive carbon atoms, and (B) *l*-menthol, and separating the levorotatory α-NpMePhSi(OMen) so produced, where (OMen) is a menthoxy radical; the symbols α-Np, Me, and Ph representing α-naphthyl, methyl, and phenyl radicals respectively.

17. A method for the preparation of optically active organosilicon compounds which comprises carrying out an ester interchange reaction between (A)

α-NpMePhSi(OR³)

where R³ is an alkyl radical of from 1 to 5 inclusive carbon atoms, and (B) *l*-menthol, whereby optically active levorotatory α-NpMePhSi(OMen), where (OMen) is a menthoxy radical, is produced; the symbols α-Np, Me, and Ph representing α-naphthyl, methyl, and phenyl radicals respectively.

18. A method in accordance with claim 17 wherein the levorotatory αNpMePhSi(OMen) in its crude diastereomeric state is subjected to fractional crystallization and the more levorotatory isomer is isolated.

19. A method for the preparation of dextrorotatory α-NpMePhSiH which comprises contacting levorotatory α-NpMePhSi(OMen), where (OMen) represents a menthoxy group, with LiAlH₄ in liquid phase, and separating the dextrorotatory product, the symbols α-Np, Me, and Ph representing α-naphthyl, methyl, and phenyl radicals respectively.

20. A method for the preparation of levorotatory α-NpMePhSiCl which comprises reacting in a liquid phase, dextrorotatory α-NpMePhSiH with chlorine, the symbols α-Np, Me, and Ph representing α-naphthyl, methyl, and phenyl radicals respectively.

21. A method for the preparation of levorotatory α-NpMePhSiH which comprises contacting levorotatory α-NpMePhSiCl with LiAlH₄, in a liquid phase, the symbols α-Np, Me, and Ph representing α-naphthyl, methyl and phenyl radicals respectively.

References Cited in the file of this patent

Petrov et al., "Doklady Akad. Nauk, SSSR," volume 85 (1952), pages 345–347 (Chemical Abstracts, volume 47, column 8,051).

Sanin et al., "Zhur Obshchei Khim.," volume 22 (1952), pages 1124–1127 (Chemical Abstracts, volume 47, column 8,029).

Eaborn et al., Chem. and Ind., 1958, page 830.

Sommer et al., Journal American Chemical Society, volume 81 (1959), page 1013.